Dec. 1, 1970          P. L. RICHMAN          3,544,895

NOISE REJECTING DIGITAL VOLTMETER

Filed Jan. 10, 1968

INVENTOR
PETER L. RICHMAN

BY Arnold, Roylance, Kruger & Durkee
ATTORNEYS

3,544,895
NOISE REJECTING DIGITAL VOLTMETER
Peter L. Richman, Lexington, Mass., assignor to Weston Instruments, Inc., Newark, N.J., a corporation of New Jersey
Filed Jan. 10, 1968, Ser. No. 696,934
Int. Cl. G01r *17/06, 19/00*
U.S. Cl. 324—99                                          3 Claims

ABSTRACT OF THE DISCLOSURE

A tracking-logic digital voltmeter including an axis crossing detector AC coupled to the signal input to an operational amplifier which drives a counter. The output of the counter is provided to a buffer store unit which can be triggered to transfer the instantaneous output of the counter in parallel to a display unit. The output of the axis crossing detector is connected to one input of an AND circuit, the other input being supplied by a variable rate pulse generator through a bistable circuit. When the AND circuit is supplied with both inputs, indicating a desired readout and a zero noise level, the buffer store circuit is triggered to transfer the counter output to the display unit.

---

Figure 1:
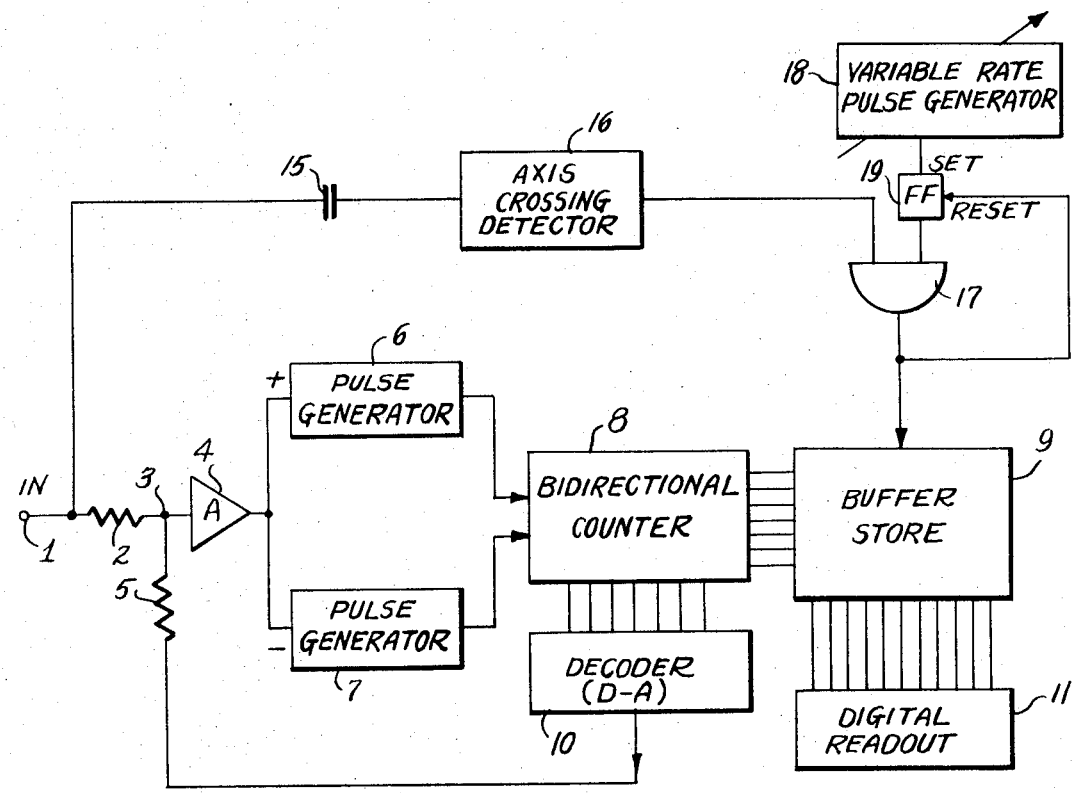

This invention relates to voltage measuring apparatus and more specifically to a meter for measuring voltage magnitude and for displaying the measured magnitude in digital form. In particular, the specific apparatus of the invention includes means for measuring the magnitude of a constant or slowly varying analog signal and for eliminating the effect of rapidly fluctuating noise superimposed on the signal to be measured.

Several types of digital voltmeters have been developed by prior art workers including voltmeters which use various techniques of integration to reject or cancel noise components in the input signal. The input is normally a DC signal, or an analog signal, the noise being a rapidly fluctuating AC component. The integration generally involves converting the input potential into a proportional rate and then counting the rate for a time equal to some multiple of the period of the largest noise component on the input signals. Obviously, the period of the noise component must be separately determined.

Another form of digital voltmeter is referred to as a tracking-logic digital voltmeter in which the input signal is applied to a summing junction at the input of an operational amplifier, the output of the amplifier being either positive or negative. The amplifier output is used to drive one of two pulse generators, the outputs of which are connected to the two inputs of a bi-directional counter. The counter is effective to count in one direction if the amplifier output is positive and is activating one of the pulse generators and in the other direction if the opposite polarity and pulse generator is operating. The output of the counter is then provided to a buffer store unit and is transferred periodically or on demand to a readout device. The output of the counter is also converted into a DC signal and is fed back to the summing junction to provide a feedback signal to the input of the operational amplifier. In this kind of apparatus it will be apparent that the output of the operational amplifier represents the difference between the input signal and the count in the counter circuit, the difference magnitude and polarity being the output of the operational amplifier. This particular kind of digital voltmeter is not especially immune to noise on the input signal because any noise merely appears to be an additional signal difference and is manifested as an additional series of pulses at one input to the di-directional counter.

An object of the present invention is to provide a digital voltmeter of the tracking-logic type which is capable of rejecting noise on the input signal in a manner as effective as the integrating type of voltmeter.

Another object is to provide apparatus responsive to the noise for transferring an accumulated pulse count to a display unit only when the noise is at a zero level.

A further object is to provide an apparatus for determining when the noise component of an input signal is crossing a predetermined level and for transferring an instantaneous count from a buffer store unit to a display unit when the axis crossing occurs.

Broadly described, the invention includes means for detecting the magnitude of the noise component in an input signal and for transferring the accumulated count stored in a buffer store unit to a display unit only when the noise level reaches zero. The zero level detection can be correlated with a periodic strobe signal to cause a transfer only when both exist.

Figure 2:
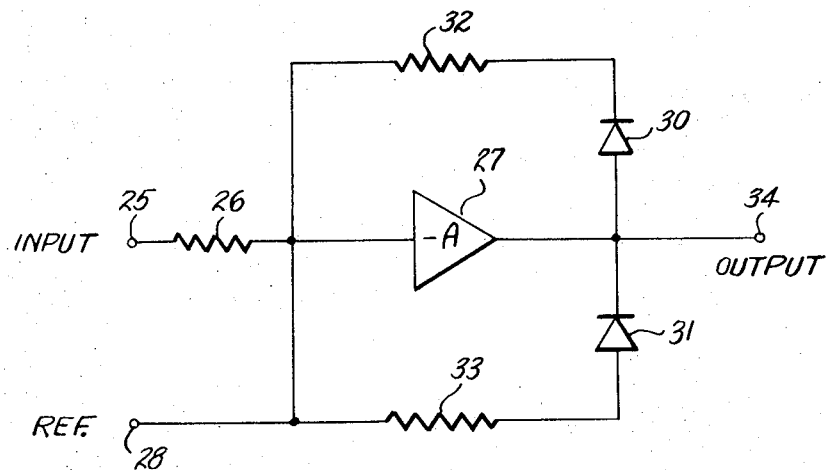

In order that the manner in which the foregoing and other objects are attained in accordance with the invention can be understood in detail, a particularly advantageous embodiment thereof will be described with reference to the accompanying drawings which form a part of the specification and wherein:

FIG. 1 is a schematic diagram of a digital voltmeter apparatus incorporating the invention; and FIG. 2 is a schematic diagram of a precise axis crossing detector usable in the apparatus of FIG. 1.

In FIG. 1 a composite input signal, which includes a DC or analog component to be measured and an AC noise component, is connected to an input terminal 1. Terminal 1 is connected through a fixed input resistor 2 to a summing junction 3 at the input of a high gain operational amplifier 4. One terminal of a fixed resistor 5 is also connected to junction 3, the sum of the currents flowing to junction 3 constituting the input to amplifier 4. The output of amplifier 4 is connected to the input terminal of a pulse generator circuit 6 and to the input terminal of a pulse generator circuit 7. Pulse generator circuit 6 can be regarded as a gated pulse oscillator and includes polarity responsive means, such as a diode, to prevent the generator from producing any pulses in response to a negative signal, the generator being effective to produce a plurality of pulses when supplied with a positive input signal. Pulse generator circuit 7 is similar to generator 6 but is responsive only to a negative output from amplifier 4 to produce output pulses for so long as the output of amplifier 4 remains negative.

The pulse outputs from generators 6 and 7 are connected to the two inputs of a conventional bi-directional counter circuit 8 which has two pulses input terminals and which operates, in a manner well understood by those skilled in the art, to increase its total count in response to pulses applied at one terminal and to decrease its accumulated total in response to pulses applied at the other terminal. Thus, pulses from generator 6 increases the count and pulses from generator 7 decrease the total count.

The total count from counter 8 is fed directly and continuously to a plurality of gate circuits in a buffer store unit 9 and to a decoder unit 10. Decoder 10, which can be a conventional digital-to-analog device, produces a DC signal which is proportional in magnitude to the total count accumulated in counter 8. The output of decoder 10 is connected through resistor 5 to summing junction 3. It will be apparent that if a difference exists between the signals at input terminal 1 and the analog output from decoder 10, this difference will be reflected in a voltage at the output of amplifier 4 the polarity of which indicates the direction of the difference. Thus, if the signal at terminal 1 is greater than the signal from decoder 10, a positive output is produced by amplified 4 which causes pulses to be generated by generator 6, resulting in an increased count in bidirectional counter 8 and an increase in the output of decoder 10, which decreases the difference and therefore tends to restore a balance. If a noise signal is superimposed on the signal at input terminal 1, counter 8 will be continuously increasing and decreasing its count in a continual effort to restore a condition of balance.

The output of counter 8 is also continually provided to buffer store unit 9 which is a conventional logic device, well known to those skilled in the art, and which includes a plurality of gate circuits and a plurality of bistable circuits. One input of each gate circuit is conected to an output of the counter. Buffer store unit 9 is of the type which maintains its output unless it is provided with a strobe or trigger signal at a control input terminal, which is connected to the other input of each gate circuit. When a trigger signal is provided a count registered at that instant at the output of counter 8 is transferred to the buffer store 9 which in turn constantly supplies digital readout unit 11 wherein the curernt or updated count is constantly displayed as a digital representation of the value of the signal applied to input terminal 1.

The signal appearing at input terminal 1 is coupled through a fixed capacitor 15 to the input terminal of an axis crossing detector 16. Detector 16 is a circuit of the type which continually monitors a signal and produces no output until the monitored signal crosses a preselected level, in this case an AC zero level. When the level crossing occurs an output pulse is produced, this output pulse being connected to one input of a conventional AND circuit 17.

The other input to AND circuit 17 is provided by the output from the SET output of a conventional bistable, or flip-flop, circuit 19. The SET input to bistable circuit 19 is provided by the pulse output of a variable rate pulse generator 18 which is manually adjustable to select a rate at which displays are to appear on unit 11. Unit 18 is a conventional variable repetition rate generator which produces pulses of relatively long duration compared to the occurrence of AC zero crossings. It will be apparent that the outputs from units 18 and 19 must exist at the input to AND circuit 17 simultaneously in order to produce an output, the output of circuit 17 being connected to buffer store 9 as the trigger or strobe signal to cause the count stored in unit 9 to be transferred to read-out unit 11. The output of AND circuit 17 is also connected to the RESET input of bistable circuit 19 to reset the circuit after a trigger pulse has been generated.

In operation, unit 16 continually monitors the AC component of signals appearing at input terminal 1 and at summing junction 3 and provides a pulse when the noise arrives at zero. AND circuit 17 is periodically conditioned by the output of bistable circuit 19 which is SET by generator 18 so that it can provide a strobe pulse as soon as the noise arrives at zero, thereby strobing buffer storage unit 9 and causing it to transfer the count currently appearing in counter 8 to buffer store 9 for readout in unit 11. It will be recognized that the count provided at unit 9 is a continually changing accumulation representative of the instantaneous level of the input signal and that, when the strobe is provided, that signal is representative of the analog component with a zero noise level so that the count actually transferred to the digital readout unit is truly representative of the noise-free DC input. Thus, the apparatus accomplishes the desired function of providing a readout of the analog signal, having rejected the noise component.

FIG. 2 is a schematic diagram of a precise axis crossing detector usable as detector 16 of FIG. 1. In FIG. 2, the AC component of the input signal is applied to an input terminal 25 and thence to one terminal of an input resistor 26, the other terminal of which is connected to a summing junction at the input of an operational amplifier 27. A reference signal is applied to an input terminal 28 which is connected to the summing junction. For zero crossing, terminal 28 is connected to ground. The output terminal of amplifier 27 is connected to an output terminal 34, to the anode electrode of a conventional semiconductor diode 30 and to the cathode electrode of a conventional semi-conductor diode 31. The cathode of diode 30 is connected through a resistor 32 to the summing junction and the anode of diode 31 is connected through a resistor 33 to the summing junction. When the input voltage reaches the same magnitude as the reference voltage, a step voltage change is produced at output terminal 34 as the internal forward diode resistance is overcome and the diodes become conductive. A circuit of this type is discussed in the text Electronic Analog Computers, by Korn and Korn, McGraw-Hill Book Company, 1956, at page 298.

While one advantageous embodiment has been chosen to illustrate the invention, it will be understood by those skilled in the art that various changes and modifications can be made therein without departing from the scope of the invention as defined in the appended claims.

What is claimed is:

1. In combination with a digital meter of the type having a bidirectional counter; converter means for producing an analog signal proportional to the accumulated count in the counter; an amplifier for accepting a composite input signal summed with the output of the converter and for providing a signal the polarity of which is representative of the direction of the difference between the summed signals; pulse generators responsive to the output of the amplifier for supplying pulses to the bidirectional counter; digital display means; and triggerable means for following the accumulated total count in the counter and for repetitively providing a corrected count to the display means in response to a trigger signal, the improvement comprising an axis crossing detector circuit having an input terminal and an output terminal; capacitor means interconnecting said input terminal of said detector and the input to the amplifier for coupling the AC component of the composite input signal to said detector; said axis crossing detector being operative to provide at said output terminal a trigger pulse whenever said AC component crosses zero amplitude; and circuit means for connecting said trigger output of said detector to said triggerable storage means whereby an axis crossing of said AC component causes a correction of the count provided to the display means.

2. In combination with a digital meter of the type having a bidirectional counter; converter means connected to said counter for producing an analog signal continuously proportional to the accumulated count in the counter; amplifier means for accepting a composite input signal summed with the output of the converter and for providing a signal the polarity of which is representative of the direction of the difference between the summed signals; pulse generators responsive to the output of the amplifier for supplying pulses to the bidirectional counter; digital display means; triggerable means for following the accumulated total count in the counter and for repetitively providing a corrected count to the display means in response to a trigger signal, the improvement comprising detector means connected to the amplifier input for accepting the AC component of the composite input signal and for providing an output pulse whenever the AC component crosses a predetermined amplitude level, manually adjustable pulse generator means for producing a series of pulses at a manually selectable repetition rate; and logic circuit means for accepting the output pulses of said detector means and said variable pulse rate generator means and for providing a trigger signal to the triggerable means whenever said outputs are provided concurrently whereby the corrected count is provided to the display means only when the AC component is at the preselected level.

3. An apparatus according to claim 2 wherein said logic circuit means comprises a bistable circuit having a SET input terminal connected to the output of said pulse generator means, a SET output terminal, and a RESET input terminal; and an AND circuit having one input terminal connected to the output of said detector means, a second input terminal coupled to the SET output terminal of said bistable circuit, and an output terminal connected to said triggerable means and to said RESET input terminal.

References Cited
UNITED STATES PATENTS

| | | | |
|---|---|---|---|
| 2,836,356 | 5/1958 | Forrest et al. | 324—99 |
| 2,958,044 | 10/1960 | Storm et al. | 328—151 |
| 3,297,947 | 1/1967 | Riordan et al. | 328—166 |
| 3,354,453 | 11/1967 | Hibbits et al. | 340—347 |
| 3,392,345 | 12/1964 | Young | 328—151X |

RUDOLPH V. ROLINEC, Primary Examiner

E. F. KARLSEN, Assistant Examiner

U.S. Cl. X.R.

324—102; 340—347